Figure 1:
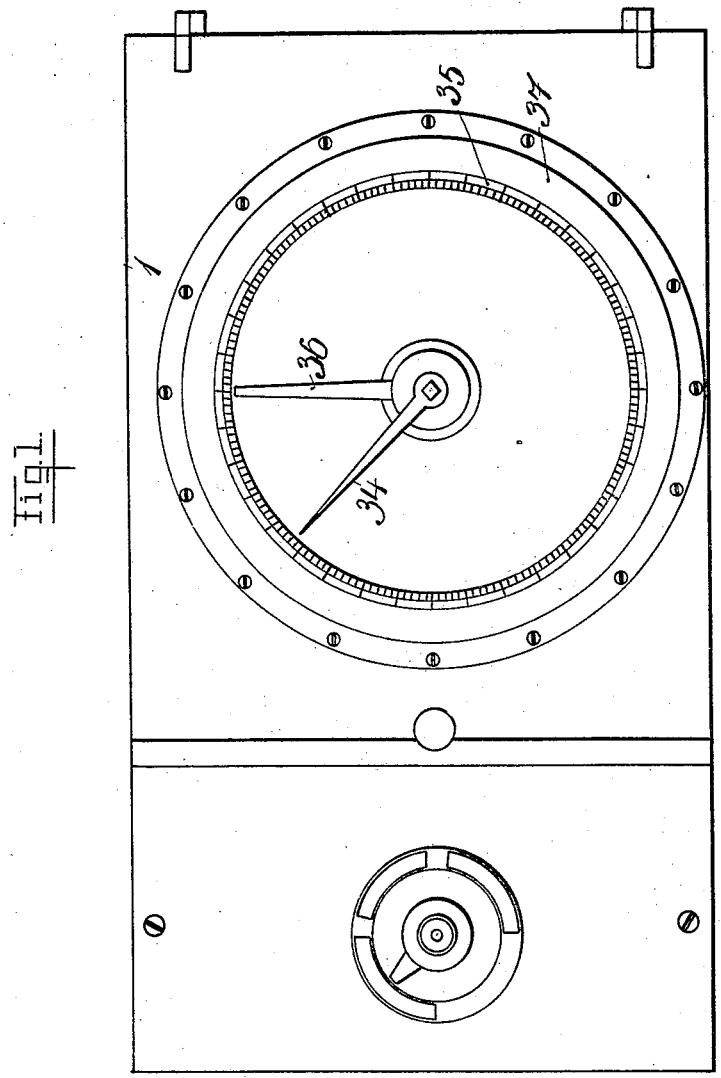

No. 855,920. PATENTED JUNE 4, 1907.
F. v. ZEPPELIN.
SIGNAL INDICATING DEVICE FOR LOCOMOTIVES.
APPLICATION FILED FEB. 7, 1905.

6 SHEETS—SHEET 1.

No. 855,920. PATENTED JUNE 4, 1907.
F. v. ZEPPELIN.
SIGNAL INDICATING DEVICE FOR LOCOMOTIVES.
APPLICATION FILED FEB. 7, 1905.
6 SHEETS—SHEET 2.
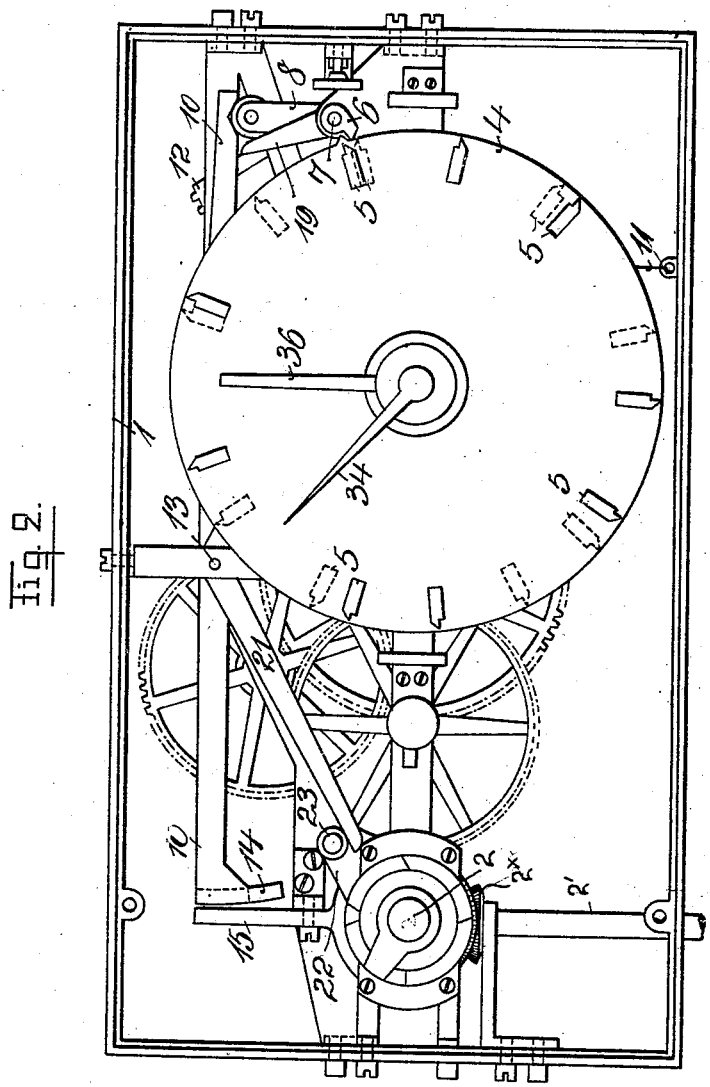
Fig. 2.
Witnesses
J. M. Kuehne
John A. Percival
Inventor
Ferdinand Graf von Zeppelin
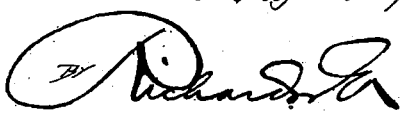
ATTORNEYS No. 855,920. PATENTED JUNE 4, 1907.
F. v. ZEPPELIN.
SIGNAL INDICATING DEVICE FOR LOCOMOTIVES.
APPLICATION FILED FEB. 7, 1905.

6 SHEETS—SHEET 3.

Witnesses
Inventor
Ferdinand Graf von Zeppelin

No. 855,920. PATENTED JUNE 4, 1907.
F. v. ZEPPELIN.
SIGNAL INDICATING DEVICE FOR LOCOMOTIVES.
APPLICATION FILED FEB. 7, 1905.
6 SHEETS—SHEET 4.
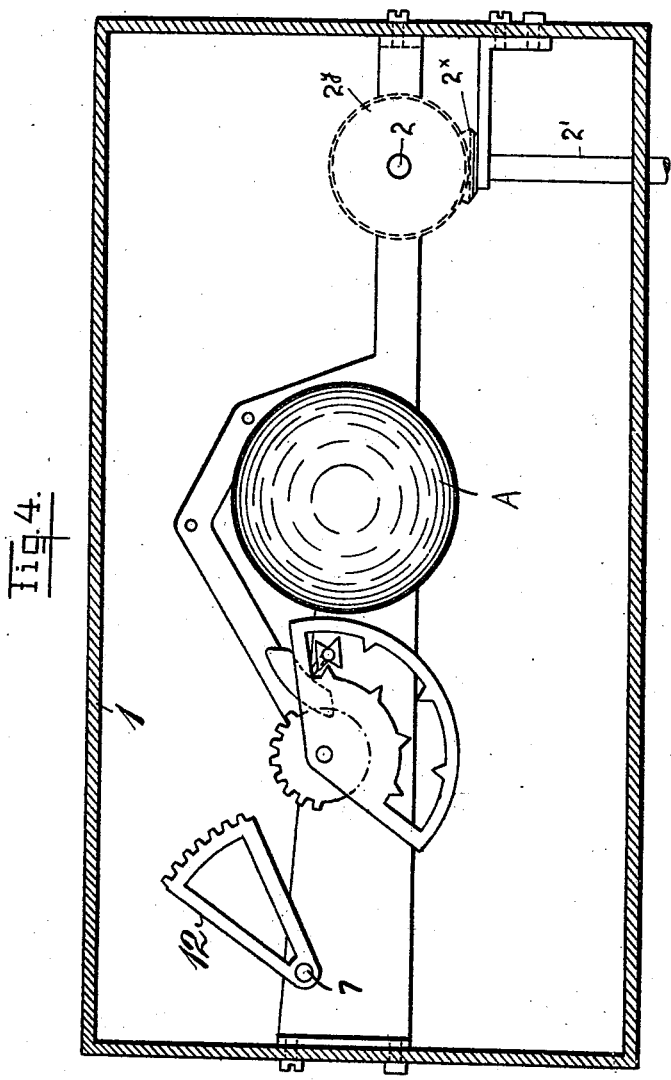

No. 855,920. PATENTED JUNE 4, 1907.
F. v. ZEPPELIN.
SIGNAL INDICATING DEVICE FOR LOCOMOTIVES.
APPLICATION FILED FEB. 7, 1905.
6 SHEETS—SHEET 5.
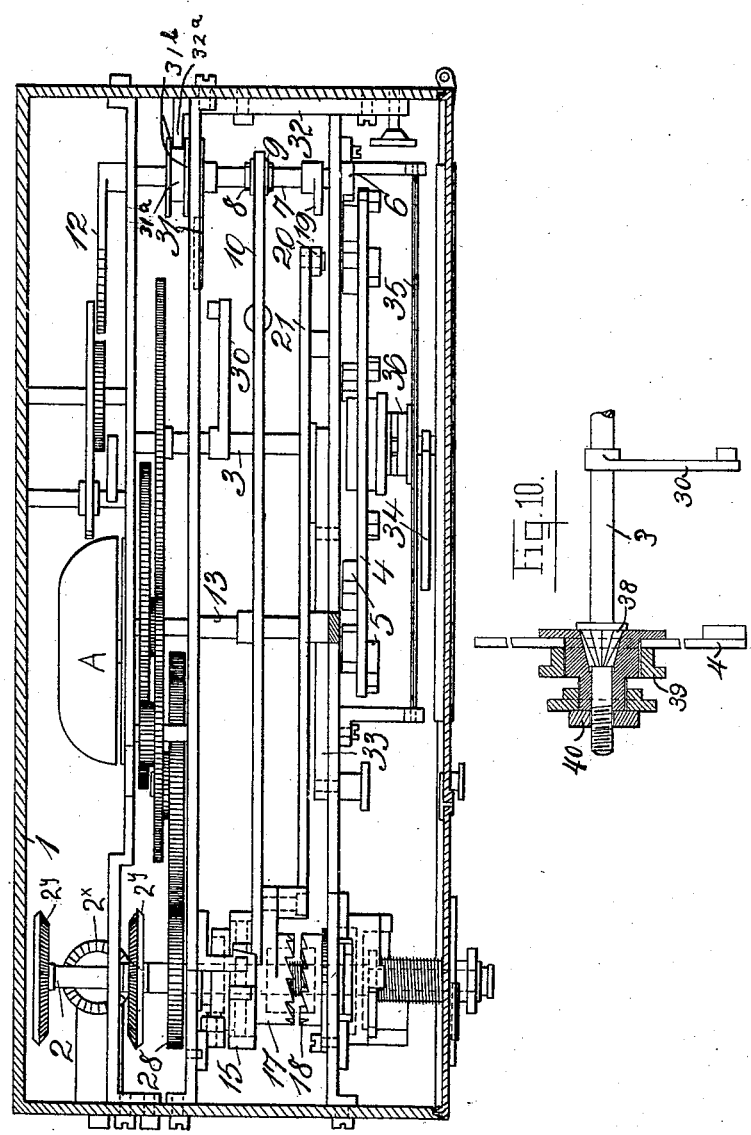
Witnesses
H. M. Kuehne
John G. Percival
Inventor
Ferdinand Graf von Zeppelin
by Richard G.
ATTORNEYS No. 855,920. PATENTED JUNE 4, 1907.
F. v. ZEPPELIN.
SIGNAL INDICATING DEVICE FOR LOCOMOTIVES.
APPLICATION FILED FEB. 7, 1905.
6 SHEETS—SHEET 6.
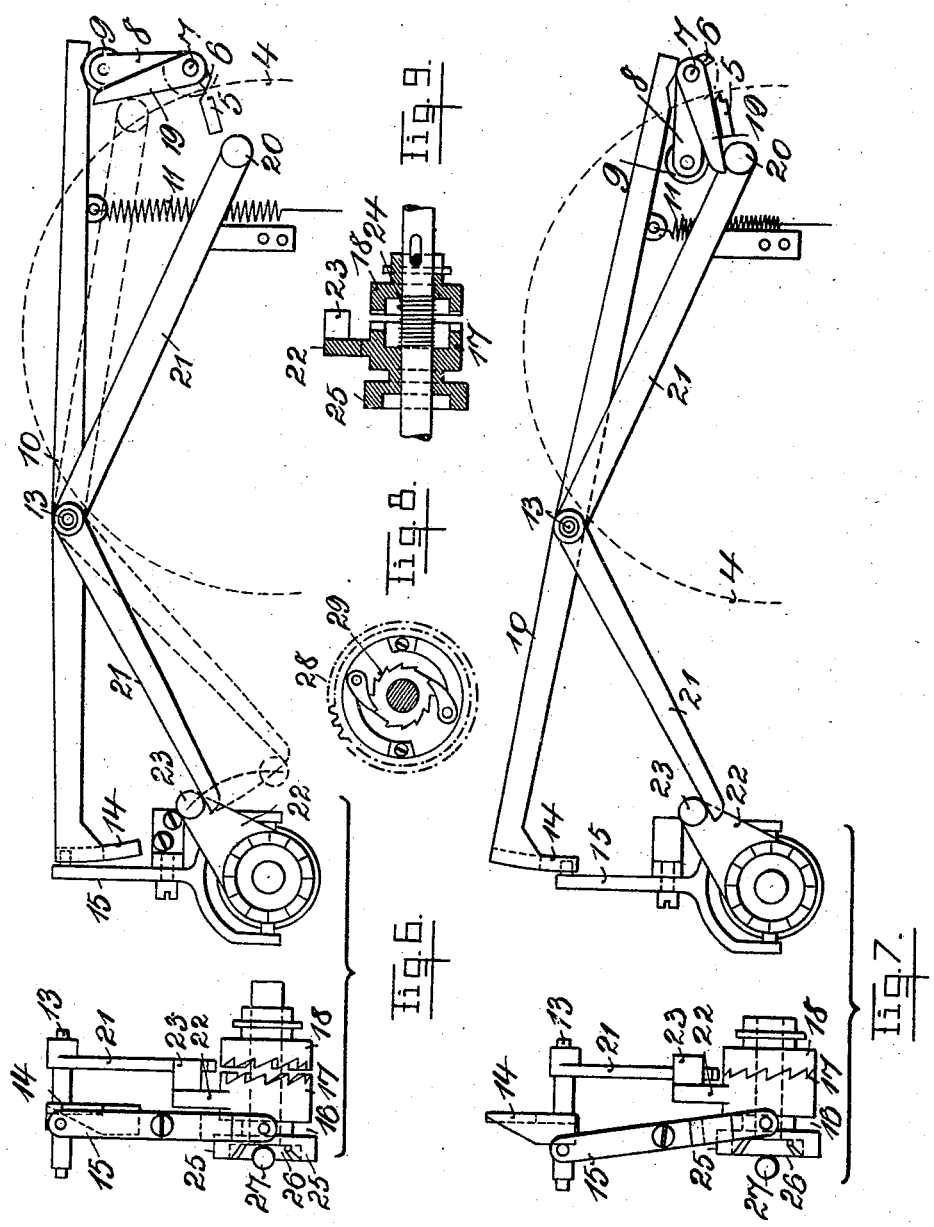

UNITED STATES PATENT OFFICE.

FERDINAND V. ZEPPELIN, OF BERLIN, GERMANY.

SIGNAL-INDICATING DEVICE FOR LOCOMOTIVES.

No. 855,920.     Specification of Letters Patent.     Patented June 4, 1907.

Application filed February 7, 1905. Serial No. 244,652.

*To all whom it may concern:*

Be it known that I, FERDINAND V. ZEPPELIN, a subject of the King of Würtemberg, residing at Berlin, W. Nürnberger Platz 25, Germany, have invented new and useful Improvements in Signal-Indicating Devices for Locomotives, of which the following is a specification.

The object of this invention is to provide an apparatus which gives information to the engineer as to the signal-boxes located in advance of him on a section of the line over which he has to travel, in order to reduce to a minimum the possibility of his running the train past said signals. This object is accomplished by means of a disk placed in the cab in the usual manner. Said disk is, appropriately, operated by the driving-wheels of the locomotive, the ratio of gear being adjusted so that the disk completes one entire revolution while the engine runs over the distance between two terminal stations, that is to say while it runs from the beginning to the end of the trip. The circumference of said disk corresponds, therefore, to the distance to be traveled. On this disk cams are provided corresponding, in due proportion, to the distances between the signals. During the gradual revolution of the disk which carries the cams, the latter act successively by turning-over a lever. The movement of said lever is used for operating a mechanism comprising visible or audible means for giving information to the engineer as to the next signal located in advance of him. An alarm-bell may, appropriately, be used with this apparatus.

According to the present invention, the movement of the lever, which is turned-over by each cam, acts so as to release a spring-arrangement, and the latter serves at once to cause the ringing of a bell used as audible signal and to throw in gear a coupling-device with a shaft to which continuous rotary movement is imparted by the locomotive-wheels, so as to replace the spring-arrangement itself with all the elements belonging thereto, as well as the lever turned-over by the cams, in their initial position.

Figure 3:
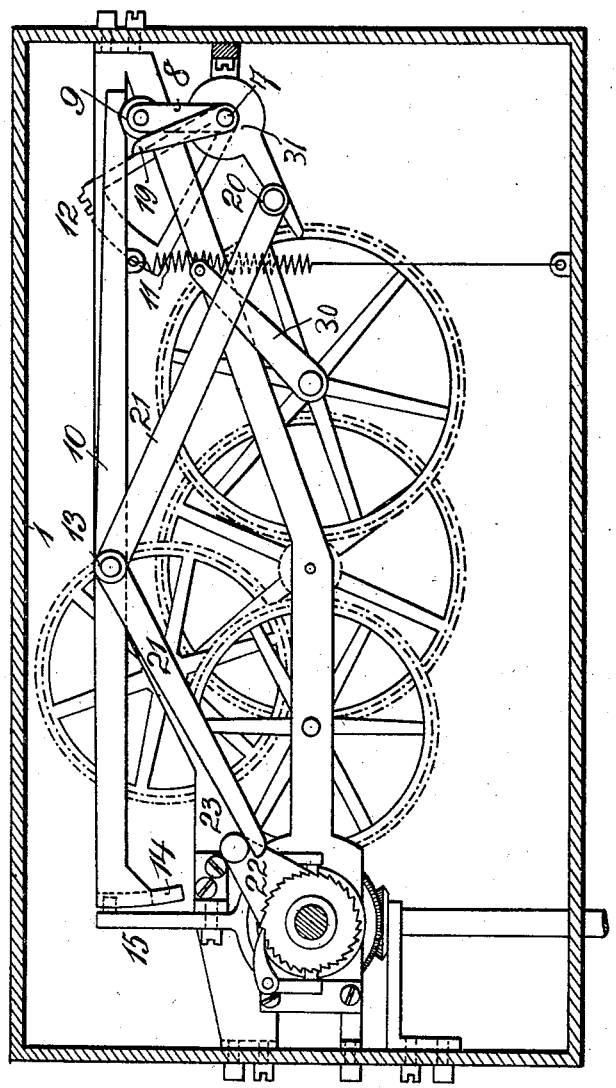

The annexed drawings represent a form of execution of the present invention:

Figure 1 is a front view. Fig. 2 is a front view with the closing-plate removed. Fig. 3 is a similar front view like that shown in Fig. 2, the disk with the cams being removed. Fig. 4 is a rear view showing the alarm-bell. Fig. 5 is a top view. Figs. 6–10 represent details.

In case 1 a shaft 2 is located in any desired manner. To this shaft movement is imparted from a driving-crank of the engine by any preferred arrangement, for example by means of a shaft 2' and gears $2^x$ and $2^y$. This shaft 2 has a continuous rotary movement and it is connected by multiple gear with shaft 3 which carries in front a disk 4 with cams 5 (see Fig. 2 and 5). The ratio of gear between shafts 2 and 3 must be determined so that disk 4 will complete but one entire revolution around its axis, while the engine travels over the known distance between two terminal stations. Cams 5 are secured to disk 4 at intervals which correspond, in due proportion, to the distances between the single signal-boxes or signals of the line.

The cams which are secured on both sides of disk 4 and of which only those placed on the rear-side of the disk (in Fig. 2 they are indicated by hatching strokes) become effective, can be arranged, according to requirements, so that one side of the disk may be used for the down-trip—for example, from Berlin to Halle—and the other side for the return-trip—from Halle to Berlin—(see arrangement shown in Fig. 2), or else one of the two disk-sides may be used for the trip over a second line.

The position of the cams is suitably determined so that the distance between the first cam and the zero-point of the disk is, proportionally, smaller than the distance between the first signal-box and the station of departure, so that the engineer's attention is called to the signal-box when the latter is still located about 600 meters in advance of him. The second cam and the following cams are then secured with intervals between them which correspond to the actual distances separating the signal-boxes from each other. During the revolution of disk 4 cams 5 act successively by turning-over and by moving upwardly lever 6, the latter being fixed to shaft 7 on which is wedged, among others, arm 8. This arm carries on top a roll 9 which, in the position of rest, lies in a recess provided on lever 10. By the revolution of shaft 7 roll 9 is made to leave the recess of lever 10 and the latter, being then no longer supported by arm 8, can be drawn downward by means of spring 11. The lever 10 continues hereby to exert pressure on arm 8 or on roll 9 and causes the latter and shaft 7 to keep up their rotary motion in the same direction, until lever 10 rests on arm 8 which is now entirely turned-over (Fig. 7). On shaft 7 is also fitted-up the toothed sector 12 (Fig. 3, 4 and 5), and, when shaft 7 rotates, it causes an alarm-bell A to ring in the usual manner, as represented, for example, in Fig. 4. In order that all these elements may again be put in their initial position the following arrangement is provided: Lever 10, placed in or near its middle on a shaft 13, is free to rotate; at its other end said lever is furnished with a sloped pressing-part 14 which places itself against a roll on a lever 15 pivoted at its middle part. The lever 15 is shaped at its lower end in a forked form (Fig. 6 and 7) and engages with studs or rolls secured to the fork-ends in groove 16 of coupling-part 17 adapted to move freely on shaft 2. When a cam 5 strikes against lever 6 causing this lever 10 to pass from the position shown in Fig. 6 into that represented in Fig. 7, the lastnamed lever 10 turns-over, during this movement, by means of its sloped pressing-part 14, the lever 15 and causes thus coupling-part 17 to be thrown in gear with coupling-part 18 wedged on shaft 2; in this manner coupling-part 17 is made to take part in the motion. On shaft 7 is also secured lever 19, and when this shaft rotates said lever is passed downward so far that it rests on roll 20 of lever 21 (Fig. 7). Lever 21 is adapted to turn freely on shaft 13. Coupling-part 17 carries an arm 22 which, in the position of rest, lies with its roll 23 close to the one end of lever 21 (Fig. 3, 6 and 7). If now the coupling is thrown in gear and causes part 17 to revolve, then arm 22 carries along the lever 21 by means of its roll 23; lever 21 lifts with its roll 20 the lever 19 the movement of which is communicated to shaft 7 (Fig. 6 and 7). Owing to this revolution which shaft 7 makes in an opposite direction, lever 10, too, is lifted by arm 8 until roll 9 of the latter springs, finally, into the recess of lever 10, locks the latter and tensions spring 11 again. This reciprocal action of parts 21, 8, 19, etc. is constantly repeated while the disk revolves, as represented in Fig. 6 and 7. However, as such backward motion of lever 10 causes the sloped pressing-part 14 secured thereto to rise again, the connection between coupling-parts 17 and 18 would be separated under the influence of spring 24 lying between them (Fig. 9) and the various parts would come to a standstill before having reached again their initial position. In order to prevent this, coupling-part 17 has a projecting ring-shaped rim 25 (Fig. 5, 6 and 7) with a recess 26 into which extends a stud 27 with roll. This stud may be secured either to the frame or to the case of the apparatus. When coupling 17 is thrown in gear (Fig. 7) part 17 is shifted so that stud 27 is made to leave the recess 26; the revolution of part 17 causes stud 27 to be placed against rim 25 and to prevent the return-movement of coupling-part 17 also after pressing-part 14 has released lever 15. Coupling-part 17 and the remaining parts connected therewith or depending therefrom must therefore move along until part 17 completes one revolution allowing stud 27 to spring again into recess 26. All the elements are thus enabled to reach again their initial position and roll 9 is made to spring, positively, into the recess on lever 10. The latter is wide enough to allow sufficient play for the rotary motion required for inserting, without difficulty, the coupling-part 17 when the latter passes toward the left from its supporting-lever 21. As disk 4 can revolve only in one direction, the toothed wheel 28 which communicated the movement of shaft 2, is not secured directly to shaft 2, said wheel being placed on a toothed sleeve 29 on which it turns loosely, (Fig. 8). The sleeve itself takes always part in the rotary movement of shaft 2. Two catches are provided on toothed wheel 28 in such a manner that the latter is carried along by sleeve 29 (Fig. 8), only if the latter revolves in one direction.

In order that it may also be possible to use this apparatus for retrograde motion, that is to say in those cases when the locomotive is run with its tender placed in front, a reversible gear (Fig. 5) is provided by means of which shaft 2 may be rotated, at will, in the one or in the other direction. The reversible gearing-mechanism may also be used for throwing the apparatus out of gear. To this purpose the reversible wheels are placed at such a distance from each other that, in a center position, none of the reversible wheels gears into the conical toothed wheel placed between them.

The reversible wheels may be adjusted in any preferred known manner.

In the construction of this apparatus the possibility has also been considered that, when a section of the line is being repaired or rebuilt or when there are other reasons, it may, at times, become necessary to employ a distinct signal-box for giving information to the engineer that the train has to be stopped or that its speed has to be slackened. To this purpose levers 30 and 31 (Fig. 3 and 5) are provided.

Lever 31 is secured on shaft 7 of lever 6 so that it can be shifted longitudinally, while lever 30 is firmly wedged on shaft 3; the latter carries, in front, the index 34 which, too, is rigidly secured to it (Figs. 1, 2 and 5). The aforesaid two levers are made to engage into each other by means of shifting lever 31 on shaft 7 until it lies in a vertical plane with lever 30; in order to render this possible, slide 32 enters with its finger 32ª into a groove 31ª of sleeve 31ᵇ (Fig. 5) carrying the lever 31, so that, when lever 32 is shifted, lever 31, is carried along. Now lever 30 and index 34 must be adjusted in such a manner that, when the apparatus is put in operation, lever 30 strikes, at the required moment, for instance, at a distance of 1 km. in advance of the place where an extraordinary signal is located, against lever 31 and it (lever 30) turns by means of said lever 31 the shaft 7 so as to cause the alarm device to act. In order to make it possible to effect this adjustment of lever 30 independently of disk 4, shaft 3 is adapted to be slightly shifted in its direction of length and to be slightly pushed out of the nave of disk 4. To this purpose, a fluted cone 38 (Fig. 10) mounted on shaft 3 fits into the corresponding conical nave 39 of disk 4 and, in this position, it carries along disk 4 during the revolution of shaft 3. Slide 33 engages into a groove of shaft 3 (which is not visible in Fig. 5) and holds the cone 38 firmly secured in nave 39. If slide 38 in Fig. 5, is shifted toward the left, it releases shaft 3, the latter, too, can now be shifted in its direction of length, its connection with disk 4 being thus interrupted; shaft 3 is then made to turn so that index 34 is moved from zero-point of the scale 35 (Fig. 1)—the divisions of which scale correspond to kilometers—and that the division to which it points indicates, for instance, a distance equal to that between the location of the extraordinary signal and the first station of departure minus one kilometer. Lever 30 and index 34 having been adjusted, shaft 3 is again placed in the initial position and secured by means of pushing back slide 38. Fig. 10 shows that, in order to bring about a firm connection between shaft 3 and disk 4 respectively nave 39, there may also be arranged in front of shaft 3 a nut 40 adapted to be tightened by means of thread 41; this nut is loosened in order to adjust lever 30 and index 34, and, after having adjusted said parts, it is tightened in order to insure the friction-coupling between shaft 3 and disk 4.

36 is an index which moves gradually on the outer scale. Index 36 is connected with the driving gear of the disk 4 to which the cams 5 are secured and it moves on the scale in a corresponding manner. The purpose of this index is merely to enable the engineer to find out, by means of one look upon the position of the index, that place of the tracks where the engine just happens to be. From the position of said index the engineer can know whether and at what distance some signal has to be expected within a short time on the line. The arrangement of the index is such that he is not compelled to await the optical or acoustic signal given by the present device, but he may find out from the position of the index whether some signal will soon be reached. Moreover, this index enables the engineer to control the apparatus, for said index has also the further advantage that the engineer can convince himself from this movement whether the apparatus works properly. If by some accident, for instance by some foreign body coming into the mechanism of the apparatus or by means of the breaking of some part of the gear transmitting motion from the locomotive axis to the apparatus, the latter is disengaged or its work rendered irregular and inexact, then the engineer would not be able to know if this index 36 were wanting. The uniform gradual movement of the index 36 on the scale belonging thereto informs the engineer that the apparatus is in order and that he can depend upon it.

I claim as my invention:—

1. Signal-indicating apparatus for locomotives, consisting of a disk, a shaft driven by the locomotive-wheels connections from the shaft to the disk, said disk completing one entire revolution while a certain distance between two terminal stations is traveled, cams on the disk at intervals corresponding proportionally to the distances between the signal stations, and indicating apparatus operated by said cams, said apparatus consisting of a lever operated by the cams, a coupling device on the shaft, an alarm and a spring-arrangement serving at once to operate the alarm-bell and to throw in gear the coupling device thus causing said shaft to replace the parts in their initial position, said spring arrangement being operated by the lever.

2. Signal indicating means for locomotives, consisting of a main shaft driven from the locomotive wheels, a disk, a shaft carrying the same connections from the shaft to the disk, shaft cams on the disk, an alarm, a coupling device on the main shaft, means operated by the cams for actuating the alarm and for actuating the coupling device to return the parts to their initial position and means for indicating temporarily installed signals, said means consisting of an adjustable lever placed on the disk shaft and a second lever connected with the alarm and coupling device operating means so that said means may be operated at any desired point by adjusting the adjustable lever.

In testimony whereof I have signed my name to this specification in the presence of two subscribing witnesses.

FERDINAND V. ZEPPELIN.

Witnesses:
 WOLDEMAR HAUPT,
 HENRY HASPER.